(12) United States Patent
Slobotskoy et al.

(10) Patent No.: US 8,966,103 B2
(45) Date of Patent: Feb. 24, 2015

(54) METHODS AND SYSTEM FOR PROCESSING TIME-BASED CONTENT

(75) Inventors: Vitaliy M. Slobotskoy, Arlington, MA (US); Catherine A. Yadlon, Townsend, MA (US)

(73) Assignee: General Instrument Corporation, Horsham, PA (US)

( * ) Notice: Subject to any disclaimer, the term of this patent is extended or adjusted under 35 U.S.C. 154(b) by 352 days.

(21) Appl. No.: 11/962,845

(22) Filed: Dec. 21, 2007

(65) Prior Publication Data
US 2009/0164652 A1   Jun. 25, 2009

(51) Int. Cl.
| | | |
|---|---|---|
| G06F 15/16 | (2006.01) | |
| H04N 21/6587 | (2011.01) | |
| H04N 5/783 | (2006.01) | |
| H04N 21/2343 | (2011.01) | |
| H04N 21/2387 | (2011.01) | |
| H04N 21/242 | (2011.01) | |
| H04N 21/8547 | (2011.01) | |
| H04N 21/44 | (2011.01) | |

(52) U.S. Cl.
CPC ........... *H04N 21/6587* (2013.01); *H04N 5/783* (2013.01); *H04N 21/2343* (2013.01); *H04N 21/2387* (2013.01); *H04N 21/242* (2013.01); *H04N 21/8547* (2013.01); *H04N 21/44004* (2013.01); *H04N 21/44016* (2013.01)
USPC ............................ 709/231; 709/246; 386/343

(58) Field of Classification Search
CPC ..... H04N 21/44–21/44004; H04N 21/440281; H04N 21/44016; H04N 21/238–21/23805; H04N 21/2387; H04N 21/242; H04N 21/8547; H04L 65/4084; H04L 65/602
USPC .............. 709/231–233, 246–247; 725/87–90; 386/343–351; 348/423.1
See application file for complete search history.

(56) References Cited

U.S. PATENT DOCUMENTS

| | | | |
|---|---|---|---|
| 5,021,893 A | 6/1991 | Scheffler | |
| 5,041,921 A | 8/1991 | Scheffler | |
| 5,233,477 A | 8/1993 | Scheffler | |
| 5,365,381 A | 11/1994 | Scheffler | |
| 5,418,654 A | 5/1995 | Scheffler | |

(Continued)

FOREIGN PATENT DOCUMENTS

| | | |
|---|---|---|
| JP | H10200854 A | 7/1998 |
| JP | 2006121601 A | 5/2006 |

OTHER PUBLICATIONS

PCT International Search Report; Re: PCT Application #PCT/US08/87070 Dec. 17, 2008.

(Continued)

*Primary Examiner* — Patrice Winder
*Assistant Examiner* — Julian Chang
(74) *Attorney, Agent, or Firm* — Lori Anne D. Swanson (57) ABSTRACT

A method of processing time-based content includes streaming the time-based content to a receiving device in a normal mode, evaluating a numerical difference between a program clock reference timestamp and a decode timestamp in the content at a transition out of said normal mode, streaming the content to the receiving device in a trick play mode, and altering the content during the trick play mode such that a numerical difference between the timestamps at a transition back into the normal mode is substantially equal to the numerical difference between the timestamps at the transition out of said normal mode.

23 Claims, 9 Drawing Sheets

(56) References Cited

U.S. PATENT DOCUMENTS

| | | | |
|---|---|---|---|
| 5,502,601 A | 3/1996 | Scheffler | |
| 5,859,660 A | 1/1999 | Perkins et al. | |
| 5,900,830 A | 5/1999 | Scheffler | |
| 5,956,088 A | 9/1999 | Shen et al. | |
| 6,031,960 A * | 2/2000 | Lane | 386/326 |
| 6,064,794 A | 5/2000 | McLaren et al. | |
| 6,101,195 A * | 8/2000 | Lyons et al. | 370/498 |
| 6,137,834 A * | 10/2000 | Wine et al. | 375/240 |
| 6,169,843 B1 | 1/2001 | Lenihan et al. | |
| 6,233,238 B1 | 5/2001 | Romanowski et al. | |
| 6,233,389 B1 | 5/2001 | Barton et al. | |
| 6,263,154 B1 | 7/2001 | Scheffler | |
| 6,330,286 B1 * | 12/2001 | Lyons et al. | 375/240.28 |
| 6,343,346 B1 | 1/2002 | Olnowich | |
| 6,710,814 B1 * | 3/2004 | Ueno et al. | 348/500 |
| 6,741,290 B1 * | 5/2004 | Wells | 348/512 |
| 6,744,815 B1 * | 6/2004 | Sackstein et al. | 375/240 |
| 6,766,360 B1 | 7/2004 | Conway et al. | |
| 6,771,703 B1 * | 8/2004 | Oguz et al. | 375/240.03 |
| 6,871,006 B1 * | 3/2005 | Oguz et al. | 386/346 |
| 6,892,022 B1 * | 5/2005 | Bonfiglio et al. | 386/241 |
| 6,937,770 B1 * | 8/2005 | Oguz et al. | 382/235 |
| 6,993,081 B1 * | 1/2006 | Brunheroto et al. | 375/240.28 |
| 7,023,924 B1 * | 4/2006 | Keller et al. | 375/240.26 |
| 7,027,713 B1 * | 4/2006 | Hallberg | 386/346 |
| 7,031,348 B1 * | 4/2006 | Gazit | 370/504 |
| 7,096,481 B1 * | 8/2006 | Forecast et al. | 725/32 |
| 7,240,143 B1 | 7/2007 | Scheffler et al. | |
| 7,298,741 B2 * | 11/2007 | Hung | 370/389 |
| 7,327,790 B1 * | 2/2008 | Bretl et al. | 375/240.26 |
| 7,382,805 B1 | 6/2008 | Raza et al. | |
| 8,689,267 B2 * | 4/2014 | Hunt | 725/86 |
| 2001/0013123 A1 * | 8/2001 | Freeman et al. | 725/34 |
| 2002/0085592 A1 * | 7/2002 | Ono et al. | 370/535 |
| 2002/0087976 A1 * | 7/2002 | Kaplan et al. | 725/34 |
| 2002/0128823 A1 | 9/2002 | Kovacevic | |
| 2003/0043924 A1 | 3/2003 | Haddad et al. | |
| 2003/0077071 A1 * | 4/2003 | Lin et al. | 386/68 |
| 2003/0118243 A1 * | 6/2003 | Sezer et al. | 382/245 |
| 2003/0185238 A1 | 10/2003 | Strasser et al. | |
| 2004/0002969 A1 * | 1/2004 | Perng et al. | 707/3 |
| 2004/0117858 A1 | 6/2004 | Boudreau et al. | |
| 2005/0004940 A1 * | 1/2005 | Ikeda | 707/104.1 |
| 2005/0010960 A1 | 1/2005 | Kitazawa et al. | |
| 2005/0180735 A1 | 8/2005 | Oshima et al. | |
| 2006/0093045 A1 | 5/2006 | Anderson et al. | |
| 2006/0093315 A1 | 5/2006 | Kelly et al. | |
| 2006/0146780 A1 * | 7/2006 | Paves | 370/348 |
| 2006/0146850 A1 * | 7/2006 | Virdi et al. | 370/412 |
| 2007/0140647 A1 * | 6/2007 | Kusunoki et al. | 386/68 |
| 2007/0283380 A1 * | 12/2007 | Aoki et al. | 725/32 |
| 2008/0059724 A1 * | 3/2008 | Stifter, Jr. | 711/154 |
| 2008/0170687 A1 * | 7/2008 | Moors et al. | 380/200 |
| 2008/0304810 A1 * | 12/2008 | Rijckaert et al. | 386/68 |
| 2009/0077581 A1 * | 3/2009 | Kim et al. | 725/38 |
| 2010/0129056 A1 * | 5/2010 | Connery et al. | 386/95 |

OTHER PUBLICATIONS

NSE4256 Network Search Engine, Netlogic, Revision 2.0, pp. 1-44, 2002.

Wikipedia, The Free Encyclopedia, "MPEG-2," accessed at http://en.wikipedia.org/wiki/MPEG-2, accessed on Jun. 1, 2006, Wikipedia Foundation, Inc., pp. 1-9.

Office Action mailed Aug. 30, 2012 in Canadian Patent Application No. 2706715.

Search and Examination Report mailed Nov. 16, 2012 in Great Britian Patent Application No. 1219115.1.

Examination Report mailed Jan. 31, 2012 in Great Britian Patent Application No. GB1008168.5.

Examination Report mailed Aug. 22, 2012 in Great Britian Patent Application No. GB1008168.5.

Examination Report mailed Nov. 15, 2012 in Great Britian Patent Application No. GB1008168.5.

International Search Report and Written Opinion for Internation Applicatino No. PCT/US2007/085757 mailed on Apr. 24, 2008.

* cited by examiner

METHODS AND SYSTEM FOR PROCESSING TIME-BASED CONTENT

BACKGROUND

The term "multimedia content" refers to a wide variety of material such as motion picture video, television programming, audiovisual presentations, web pages and the other types of content. Multimedia content can be continuous (e.g., video or audio) or non-continuous (e.g., text or html for a web page). In some examples, the multimedia content is time-based, meaning that portions of the content are to be presented in a particular order in time and may include different elements that need to be synchronized relative to other elements of the content. For example, motion picture or video content presents images in a specific order and includes both video and audio elements that are synchronized for accurate playback. Additionally, motion picture or television programming may include subtitles or a second audio channel in another language that would need to be synchronized with the video element for accurate playback.

The various elements in such content are synchronized by referencing a common system clock. This time reference is generally associated with each of the elements and is used to ensure that the presentation of all the content elements, or single components of content, is synchronized at playback. In a particular content delivery system, there may be a number of timestamps used to ensure accurate reproduction of the content on a playback device.

This synchronization of various content elements is complicated when content is streamed over a distribution network such as a cable or satellite system, particularly where the playback speed may be controlled by an end user. For example, in a system with video-on-demand capability, a particular movie may be streamed from a headend over a cable or satellite system to local content servers. The local content servers may then stream the content to specific requesting locations "on demand." This may also include allowing the recipient or requesting user to pause, rewind or fast forward the content during playback, i.e., trick play.

In order for a content source or other device to stream multimedia content over a communication path, such as a network or a satellite link, the elements of the content are broken into presentation units, each with associated timestamps from the common system clock. A presentation unit is defined in the Motion Picture Experts Group 2, Part 1, standard. For example, in video, a presentation unit includes all the coded data for one video frame or one video field. Once the content is broken into presentation units, the resulting presentation units are encapsulated in one or more data packets for transmission. Typically, these packets are interleaved into a continuous packetized stream such that synchronized content elements for multiple programs are delivered to various receiving devices simultaneously, all the elements of the content arriving in a timely fashion. Data packets differ depending on the communication medium over which data content is transmitted.

In addition to the synchronization of elements described above, data must continuously arrive at the recipient device within a limited window of time or the playback is interrupted. Because multimedia data content may include massive amounts of data, streaming systems cannot always rely on buffering data in the receiving device to maintain the data stream. This may also complicate the need to synchronize the arriving content elements.

Existing content servers, such as equipment that delivers time-based content to a receiving device, implement timestamp updates by searching the component streams for the relevant timestamp and updating or adding a new timestamp as the content is streamed out. In many instances, the individual content elements are separated, updated with new timestamps and recombined to form a new packetized stream with the correct timing. This process must be performed in real-time for each active stream in the system and reoccurs for each request for the stream. In some instances, this processing can fail to maintain valid data streams, which results in poor presentation on the recipient's playback device.

If navigation or trick play is supported, the content server will typically build or obtain an index or table of access points prior to content being made available for streaming. This is normally performed by a software manager or hardware manager of the time-based material stream, which may be referred to as a stream processor. The processing and memory demands associated with conventional stream processing techniques limit the number of streams and stream throughput that can be supported by a given content server. In some cases, specialized stream processors may be used to assist with stream processing.

As indicated, the various timestamps used to coordinate and synchronize the output of streaming content need to be accurate to prevent artifacts or other issues during playback. Conventional content streaming systems do not maintain the accuracy of all the timestamps used in a content stream through the transitions in and out of trick play modes, particularly, the decode timestamps (DTS) and presentation timestamp (PTS). As a result, the content stream may violate the encoding standard used and may have a degraded playback quality such as artifacts that appear at trick play transitions.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As used in the present specification and in the appended claims, the term "program clock reference" or "PCR" refers to a timestamp used by a device receiving streaming media content to regenerate a local clock signal substantially locked to an original clock signal used to encode the media content.

As used in the present specification and in the appended claims, the term "decode timestamp" or "DTS" refers to timestamp that indicates to a decoder in a receiving playback device the order in which presentation units are to be decoded. The "term presentation timestamp" or "PTS" refers to a timestamp that indicates to a receiving playback device the order in which presentation units are to be presented during playback.

As used in the present specification and in the appended claims, the term "trick play" refers to reproducing streaming multimedia content under any configuration other than at a predetermined normal rate in a predetermined sequence. Examples of "trick play" operations may include, but are not limited to rewind, fast forward, pause, slow motion, and instant replay features.

As mentioned above, multimedia content is often streamed to a receiving device using packets of digital data. Unfortunately, there are deficiencies associated with conventional techniques of streaming multimedia data content. For example, existing time-based material systems are costly to scale, inefficient during navigation, and require large memory and processor overhead. They may produce unpredictable results from the receiving device due to the lack of steady, consistent timing and a legal stream (e.g., a data stream that may be properly played back at a receiving device).

To overcome these and other deficiencies, the present specification describes methods and systems for processing time-based content. Particularly, the methods and systems of the present specification are directed toward maintaining a constant monotonic increment of both the DTS (Decode TimeStamp) and PCR (program clock reference) of multimedia content while streaming both normal and trick play operations. Specifically, this is accomplished by maintaining substantially the same difference between the DTS and PCR values during trick play operations as was present immediately prior to transitioning from normal play to trick play.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The subject matter of this application is related to that of U.S. patent application Ser. No. 10/730,365, filed Dec. 8, 2003, entitled "Method and Apparatus for Processing Time-Based Content," which application also claims the priority under 35 U.S.C. §119(e) of U.S. Provisional Patent Application Nos. 60/476,673, filed Jun. 6, 2003 and 60/476,705, filed Jun. 6, 2003. All of these previous applications are incorporated herein by reference in their respective entireties.

In one illustrative embodiment, a system of streaming multimedia content ingests packetized time-based material, referred to as content for the remainder of this document, and manipulates the content to add metadata that helps enable the various trick play modes. The enhanced content is then stored for subsequent streaming. When content is requested, the system uses the enhanced content to support trick play functionality such as alternate speed playback. The metadata is removed, however, as the data is streamed to the requesting recipient.

Content to be streamed is created as a group of packets ("GOP"), or packetized stream, regardless of the type of time-based material being streamed. This is done so that multiple pieces of content, e.g., different movies, can be interleaved in one stream for transport, but remain able to be decoded individually and displayed properly on the receiving end or ends of the stream. An example of this is having one stream, containing many interleaved movies, being created at the local cable television office and outputted to a neighborhood. Once in the neighborhood, the proper shows are decoded and presented in the proper order and in the proper homes.

The metadata which is interleaved with content supports additional functionality, including the ability to "disallow" fast forward through certain segments, such as advertising, legal notices, etc. This metadata can be used for many types of file manipulation, including outputting the content using a different protocol from the one used during input.

Figure 1:
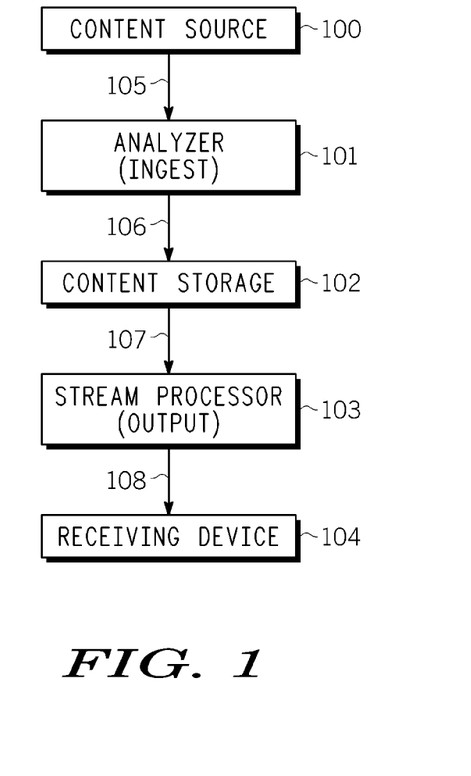
FIG. 1 is a block diagram of an illustrative high level flow of information from ingest to output according to principles described herein.

Referring to FIG. 1, an analyzer (101) pulls content (such as a stream of multimedia data) via connection (105) from a content source (100), interleaves content with metadata creating enhanced content, and outputs the enhanced content via connection (106) to content storage (102) where the content remains until requested for playback. When requested for playback, stream processor (103) pulls the enhanced content via connection (107) from the content storage (102), removes the metadata and outputs the original content using connection (108) to an appropriate receiving device (104).

In one embodiment, analyzer (101) ingests content already in packetized stream format for transmission, and stream processor (103) outputs content using the same packetized stream format with updated timestamps. This embodiment does not need to deconstruct on input and reconstruct on output. Thus, these techniques require much less processing and memory overhead during streaming and provide superior scalability as compared to the methods currently used.

Figure 2:
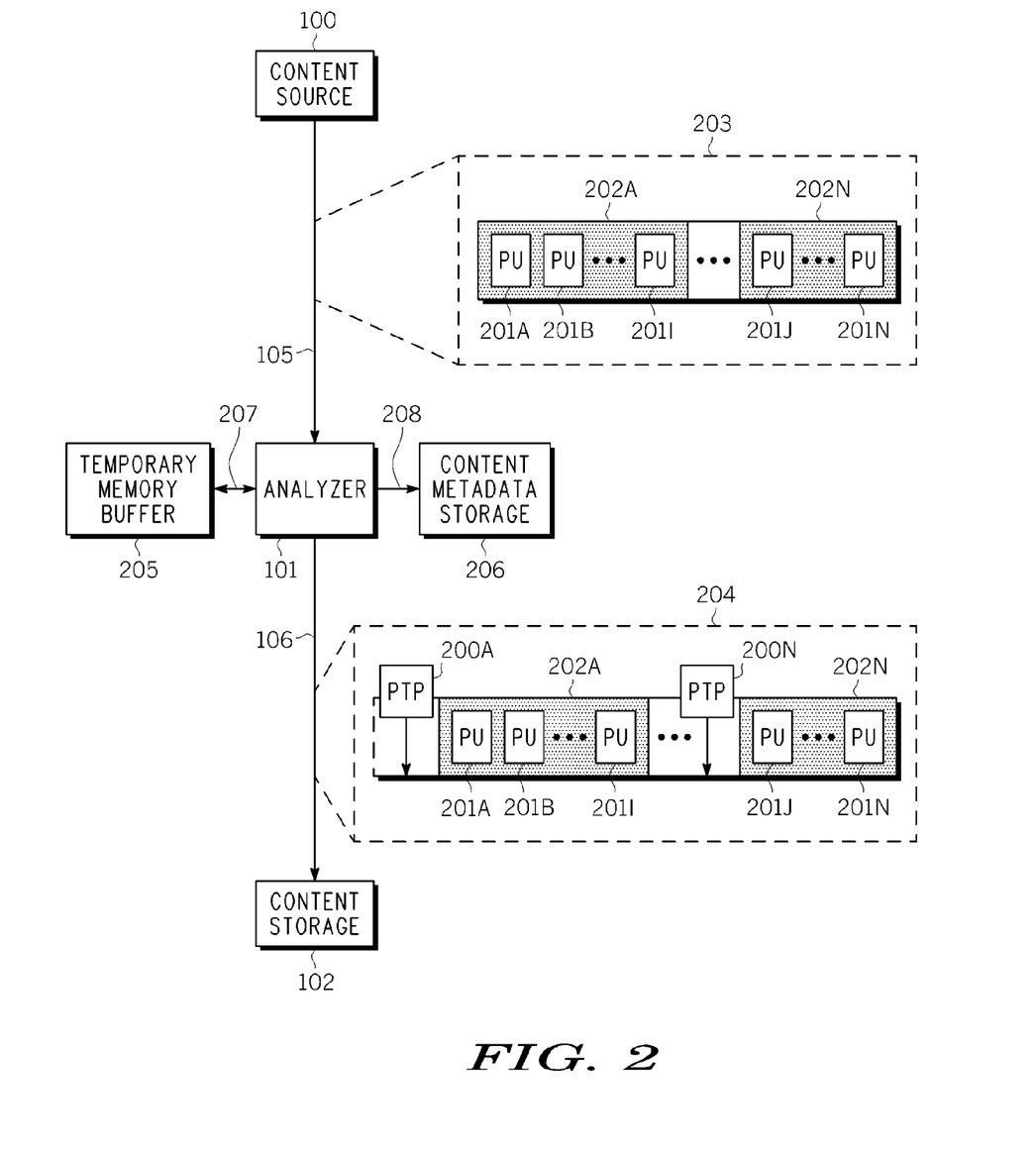
FIG. 2 is a block diagram of a portion of an illustrative system for processing time-based content, according to principles described herein.

As shown in FIG. 2, the ingest process involves the content source (100) providing original content (203) (such as a stream of audio/video data) via connection (105) to analyzer (101), which creates enhanced content (204). During the content ingest process, the content elements within the packetized stream are analyzed to locate timestamp and access point information. By performing this process at ingest, the creation of enhanced content occurs only once per content item, regardless of the number of times the content is streamed to output.

Timestamp offsets, access points, and other information or metadata resulting from this analysis may be packetized or formatted into Private Transport Packets (PTPs), which are interleaved into the packetized stream, resulting in an enhanced packetized stream, as the stream is sent to content storage. This approach means that the packetized stream is self-contained and ensures that critical information arrives at the stream processor immediately before it is needed. The resulting enhanced packetized stream is particularly suitable for processing by dedicated stream processors which can offload the work from the primary processor. These private transport packets are removed from the enhanced packetized stream immediately prior to transmission. Analyzer (101) examines content (such as presentation units 201) to build the PTPs (200A-200N) which themselves include offsets in the stream, normal play time of the stream and pointers to future and past PTPs to allow for highly efficient content navigation, particularly during trick play.

Presentation groups (202A-202N) consist of presentation units (201A-201N), which may be audio, video, or other types of content. In general, a special markers or Private Transport Packet (PTP) (200) is generated and placed before a corresponding presentation group (202A-202N) so that the presentation of the content after navigation starts with a new presentation group identified by a corresponding PTP. The pointers to distant PTPs support multiple speeds of content navigation such as fast forward and rewind. This is described in further detail below.

PTPs (200A-200N) are generally used internally (to stream processor 103) and are normally removed before content is output for streaming to a requesting recipient. An exception may be during diagnosis of a problem. A temporary memory buffer (205) stores packets from the nearby presentation groups while each PTP is being created. Using connection (207), the temporary memory buffer (205) is used so that past and future addresses can be written into the PTP.

Content data and associated PTPs are written to content storage 102 using connection (106). Using connection (208), content metadata (206) is stored and contains information about the stream, including bit stream rates. The enhanced content (204) is then ready to be streamed. While content metadata storage (206) and the content storage (102) are illustrated separately in FIG. 2, both types of data may be stored in a single memory, perhaps with a memory partition separating the two. Alternatively, separate memories may be used for content metadata storage (206) and the content storage (102).

Figure 3:
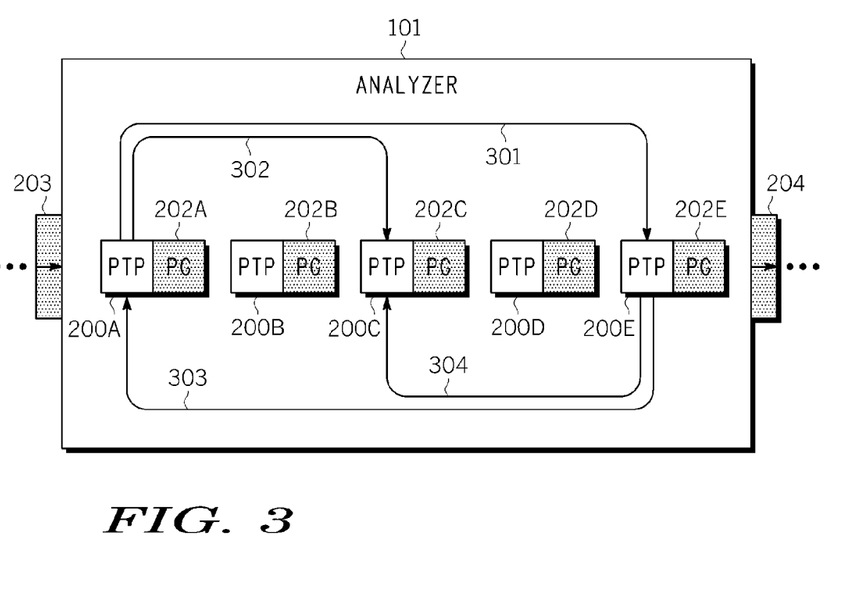
FIG. 3 is a diagram of illustrative time-based content having forward and backward pointers, according to principles described herein.

As seen in FIG. 3, the analyzer (101) views multiple presentation groups at once to generate pointers to future and past presentation groups (202). The pointers are stored in the PTPs (200). As shown in FIG. 3, content (203) enters the analyzer (101) in groups based on the maximum speed the content is to be played back by the receiving device. If the maximum speed (or fast forward) is normal play times four, as displayed in this drawing, then the analyzer processes multiple presentation groups to generate pointers to the appropriate forward and rewind locations. For example, assume each presentation group (202) is presented at one speed during normal playback. Five groups would allow the processing of four-speed, taking the original or starting point into account. Consequently, the analyzer (101) gathers information about PTPs (200A), PTP (200C) and PTP (200E). PTP (200A) stores a pointer (302) for two-speed forward from PTP (200C) and a pointer (301) for four-speed forward from (200E). PTP (200E) stores a pointer (304) for two-speed rewind from PTP (200C) and a pointer (303) for four-speed rewind from PTP (200A).

Figure 4:
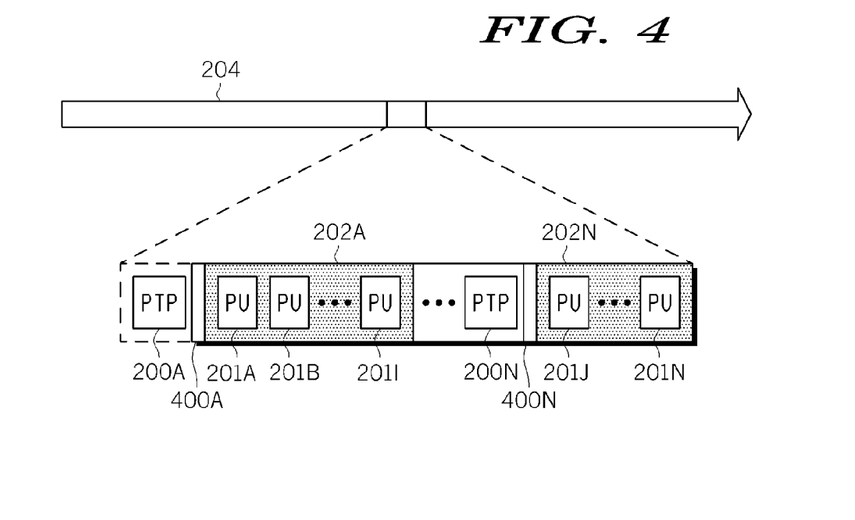
FIG. 4 is a diagram of enhanced data content, according to principles described herein.

As seen in FIG. 4, enhanced content (204) (including metadata such as pointers 301, 302, 303, 304 in FIG. 3) contains original content presentation units (201) plus corresponding PTPs (200). Each presentation group (202) may contain a video stream and may contain multiple audio streams along with a PTP packet (200) before each access point (400A-400N). An access point (400) is defined as any entry point in the stream that does not create an illegal stream playback. Access points are located at the beginning of each presentation unit group. Industry standards for the type of content may apply and the stream can be processed by any appropriate receiving device. The PTPs (200) are either removed prior to streaming to the receiving playback device or simply ignored by a receiving playback device when they are not recognized.

Figure 5:
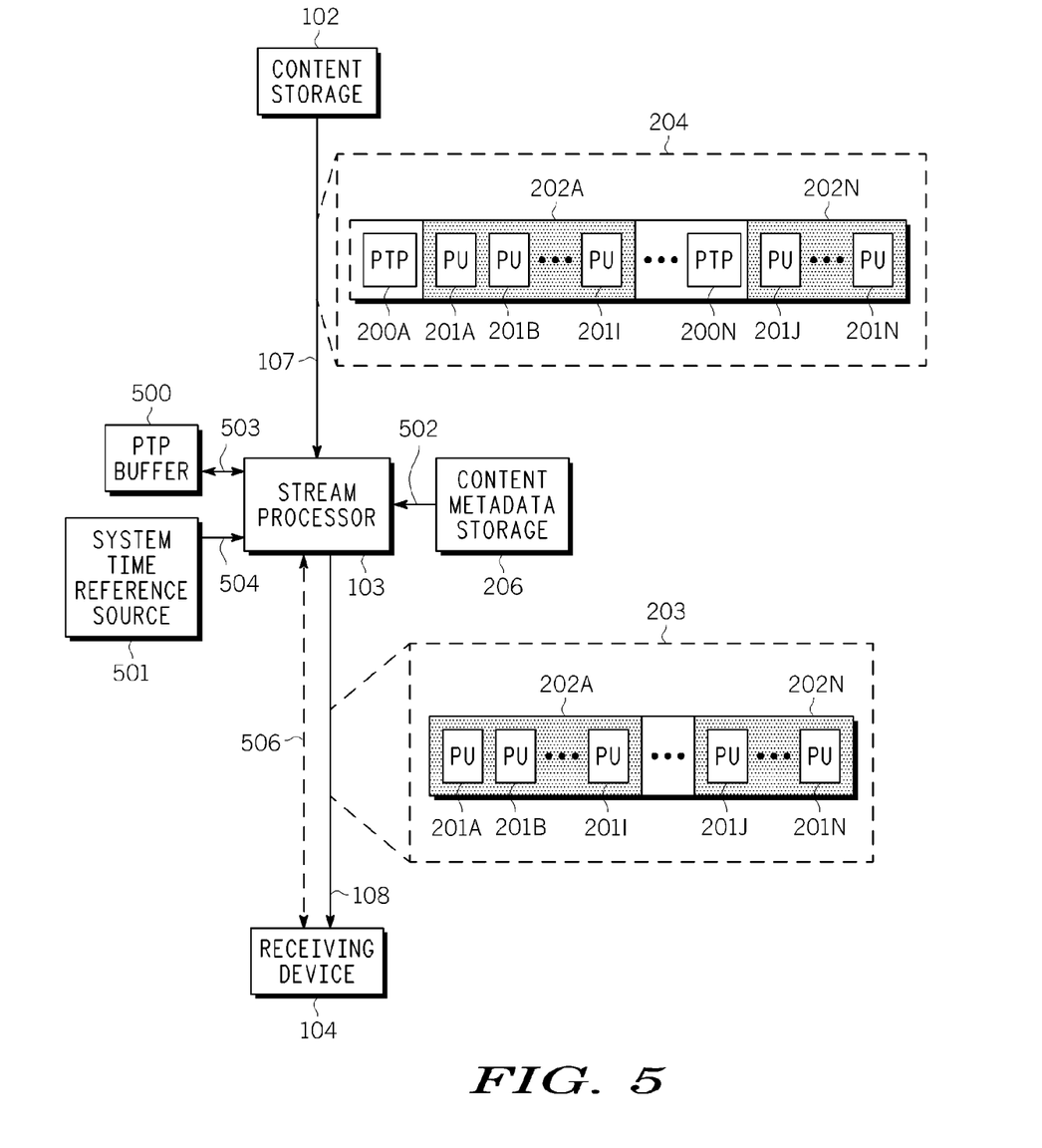
FIG. 5 is a block diagram of a portion of an illustrative system for processing time-based content, according to principles described herein.

As seen in FIG. 5, the output process shows that content metadata (206) associated with content stored in the content storage (102) is fed into the stream processor (103) using connection (502) just before the corresponding enhanced content (204) is read from the content storage (102) using connection (107). Stream processor memory holds the content metadata (206) and uses it to select which content elements are forwarded to the output stream (108). At the same time, the PTP (200) is removed from the enhanced content by the stream processor (103) and is placed in a PTP buffer (500) unique to the stream, using connection (503), so that the PTP's references (such as metadata) can be accessed during content output. This allows the stream processor (103) to efficiently update timestamps embedded in the content, by referring to the system time reference source (501) using connection (504).

Stream processor (103) may handle many streams of content at once and maintains memory for the content metadata (206) and PTPs (200) for each stream separately while processing. The PTP buffer (500) holds the PTPs (200), which are stripped from the enhanced content (204), to allow navigation during playback. As content, consisting of presentation groups (202) made up of presentation units (201), is processed by the stream processor (103), timestamps are updated in the content (203) by the system time reference source (501) using connection (504). The processed content is then output to the receiving device (104) using connection (108). This ensures that the content being output has the proper timing.

When a request for a navigation change is sent by the receiving device (104) using connection (506), the stream processor (103) reads the command and sends a reply/acceptance to the receiving device (104) using connection (506). The command stays active until a new command is received by the stream processor (103) using connection (506). For example, a Fast Forward command remains in effect until a Play or Stop command is requested by the receiving device (104). This command is read and accepted by the stream processor (103) only at the time a PTP is processed. Thus, the PTP is used as a clock.

The stream processor (103), at this point, pulls from the PTP an address (e.g., 301, FIG. 3) matching the request or command, such as a 4× Fast Forward frame address, 2× Rewind frame address or, in the case of pause, the same PTP and presentation unit. The packet immediately following a PTP (200) is located at the beginning of a presentation group. If the received command is Pause, the current access point presentation unit is resent, padded by null or filler packets, until a different command is received by the stream processor (103). Consequently, a playback device receiving the stream will display a persistent, still picture on the screen.

The stream processor (103) uses the beginning of the current presentation group as a template to maintain the structure and pacing of the content output. Existing video packets are replaced by the special repeat pictures and null packets to maintain timing. Packets corresponding to other component elements are replaced with null packets.

In Rewind and Fast Forward modes, the stream processor uses the PTP navigation pointers to select the next PTP and presentation group access point to display and then repeats this process as long as the Rewind or Fast Forward command is maintained. As discussed, one or more speeds in either direction are possible with the information contained in the PTP.

For example, when the receiving playback device (104) issues a Pause command during normal play, the stream processor (103) continues to transmit data until it encounters the next PTP and checks for a pending command. When stream processor (103) detects the Pause command it plays out the presentation unit from the access point following the PTP followed by a number of null packets, based on information in the PTP. It then inserts repeat pictures and nulls using connection (108) that cause the receiving device (104) to continue to display the picture without exceeding the buffer capacity in the receiving device (104). Stream processor (103) loops back to the current PTP and repeats the process until a new command interrupting the Pause is received.

Figure 6:
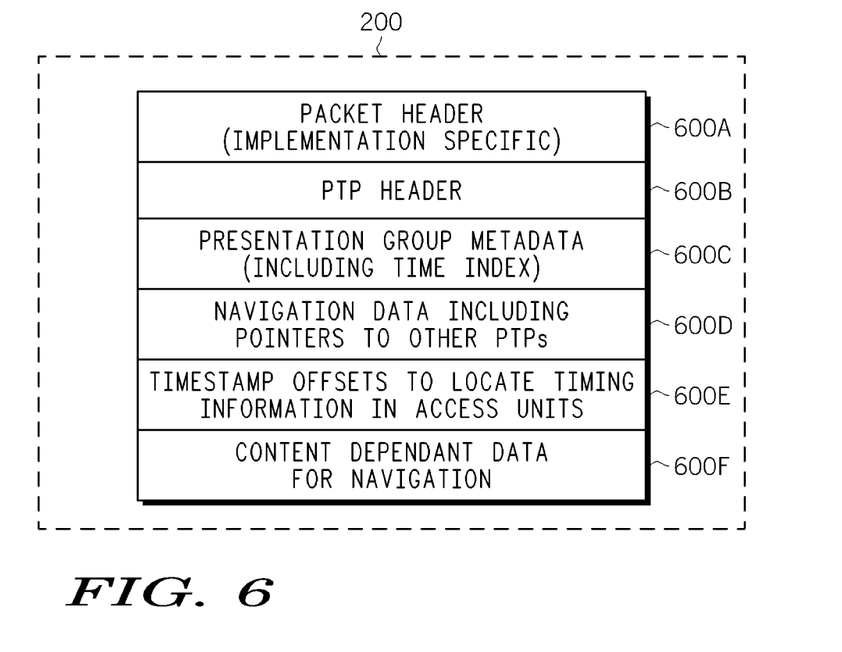
FIG. 6 is a diagram of an illustrative program group format, according to principles described herein.

As seen in FIG. 6, a PTP packet (200) is divided into multiple sections (600A-600F). The first section (600A) contains the packet header information for the stream processor (103, FIG. 5). The header is defined by the type of stream format being used. This ensures that an enhanced content stream can be processed as a normal content stream by a receiving playback device (104, FIG. 5).

The second section (600B) is the PTP header which contains internal flags and version information. This information is used by the stream processor (103, FIG. 5) to determine what operations are valid for this presentation group.

The third section (600C) is the presentation group metadata which contains flags and indicators for time indexes in the stream. These indexes allow the material to maintain real-time indexing so that the stream processor can always locate a time index for the content being streamed, such as 15 minutes beyond the start of the content play.

The fourth section (600D) includes navigation data with pointers to next, current, and previous PTPs and objects, and to the distant next and distant previous PTPs. This allows trick play including navigation control over Fast Forward, Rewind, pause, and any other non-normal play, except during any part of the playback, such as copyright, advertisements, previews, etc., during which Fast Forward or any other type of bypass may be disallowed.

The fifth section (600E) includes pointers to various timestamps which the stream processor (103) must update during output of the content. This maintains the timing and synchronization of all presentation units for this presentation group.

The sixth section (600F) is content information such as filler detail for navigation functionality. Null or filler packets may be placed between presentation units (201, FIG. 5) during navigation, thereby maintaining the required bit rate so that the buffer in the receiving device (104, FIG. 5) doesn't overflow or underflow.

Referring again to FIG. 5, the stream processor (103) generates a new packetized stream of video presentation units during navigation that provide the visual representation of the navigation requested, for example, pause, fast forward, etc. Audio is generally muted during non-normal play, but muting is not required. This packetized stream meets the requirements for a normal stream in the supported format and does not depend upon any special support from the receiving playback device (104). Because the content may be time-based material, the stream processor (103) will ensure that all buffer constraints required by the format are obeyed.

As mentioned above, during ingest, each presentation group is analyzed and information needed to support the generation of a navigation-enabled or trick play stream is recorded in the PTP (200). This can include a subset of all speeds from pause to maximum Fast Forward and Rewind. This can be thought of as different speeds of play from zero to a maximum in either direction, with zero being pause, directions being forward and rewind, and the speeds being from a creep just above pause (e.g., 1/n speed, wherein n is any integer) to the maximum speed, determined by a particular application.

One currently used common packetized time-based media type is MPEG, specifically MPEG-2 Transport. MPEG-2 Transport is typically used for the transfer of video content for cable and broadcast television and satellite. The techniques described herein may be implemented using MPEG-2 Transport for the content, but are not limited by this illustrative implementation, which is described below. MPEG-2 Transport, in this example, consists of AC-3 audio, I-pictures, B-pictures and P-pictures, each of which is approximately equivalent to a presentation unit. MPEG groups these items into Groups of Pictures ("GOPs"), the approximate equivalent of the presentation groups (202).

Figure 7:
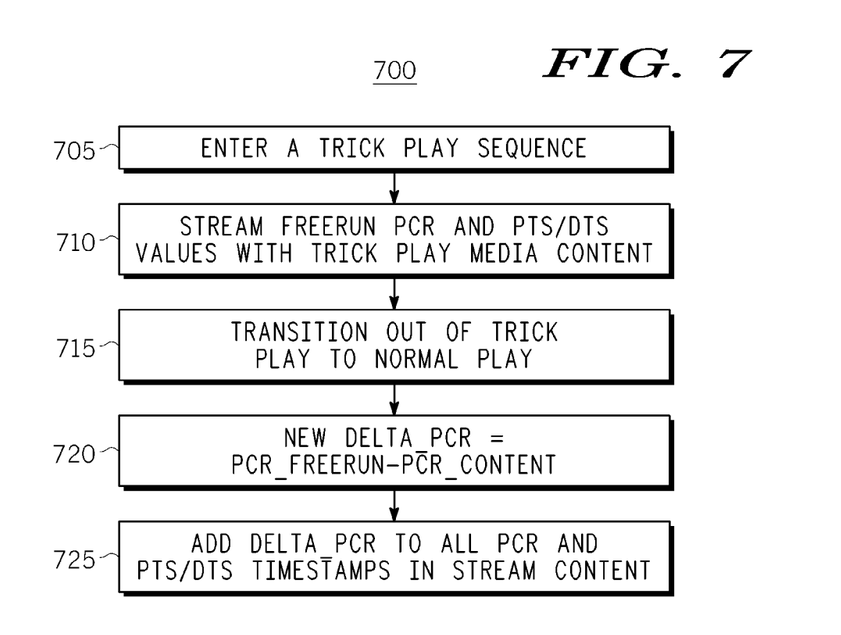
FIG. 7 is a flowchart depicting an illustrative method of processing time-based content, according to principles described herein.

Referring now to FIG. 7, a flowchart is shown depicting an illustrative method (700) of streaming media content. In many cases, a program clock reference (PCR) timestamp is encoded into content (203, FIG. 2) as it is created. When the content (203, FIG. 2) is originally encoded, typically a system time clock signal (e.g. 27 MHz) drives the encoding process. When the content (203, FIG. 2) is decoded or remultiplexed, the decoding process must be driven by a clock that is locked to the system clock signal used to encode the content (203, FIG. 2).

The PCR timestamp may include a 42 bit field including a 9 bit portion that increments at a 27 MHz rate and a 33 bit portion that increments at a 90 kHz rate (i.e. each time the 27 MHz portion rolls over) according to the 27 MHz original encoding system time clock signal. The PCR is inserted into the stream and used by the receiving playback device (104, FIG. 1) in conjunction with a voltage controlled oscillator in a phase locked loop to reproduce the system clock signal, thereby enabling the media content (203, FIG. 2) to be decoded with the correct timing.

Other timestamps that are incorporated into the media content (203, FIG. 2) include the decode timestamp (DTS) and presentation timestamp (PTS). The DTS includes a series of bits that indicate to a decoder in the receiving playback device (104, FIG. 1) the order in which presentation units (201, FIG. 2) are to be decoded. As presentation units (201, FIG. 2) are not necessarily decoded in the same order that they are to be presented to a user of the receiving device (104, FIG. 1), the presentation timestamps (PTS) are included with the media content (203, FIG. 2) to indicate the order in which the presentation units (201, FIG. 2) are to be presented to the user of the receiving playback device (104, FIG. 1).

The method (700) shown begins upon receipt of a command from a user to enter a trick play sequence (step 705). Because the content (203, FIG. 2) contains PCR and PTS/DTS timestamps that function correctly during normal play, the stream processor (103, FIG. 1) streams (step 710) PCR and PTS/DTS timestamps set to freerun values that are generated in real time during a trick play sequence. For example, the freerun PCR may be incremented proportionally to the number of transfer packets transmitted. The freerun PTS may be incremented as a function of the number of frames streamed.

When transitioning (step 715) out of trick play to normal play mode again, the freerun PCR is synchronized with the PCR timestamp in the media content (203, FIG. 2). This is done by calculating (step 720) and applying a delta_PCR value as follows:

$$delta\_PCR = PCR\_freerun - PCR\_content$$

The calculated delta_PCR value is then added (step 725) to each PCR and PTS/DTS timestamps in the media content (203, FIG. 2), and the timestamps output by the stream processor (103, FIG. 1) to the receiving device (104, FIG. 1) at a packet [i] are determined as follows:

$$PCR\_out[i] = PCR\_content[i] + delta\_PCR$$

$$PTS\_out[i] = PTS\_content[i] + delta\_PCR$$

$$DTS\_out[i] = DTS\_content[i] + delta\_PCR$$

The continuity and accuracy of the PCR, PTS, and DTS timestamps should be maintained throughout the lifetime of the stream, which may include both normal play and trick play modes in any sequence. The method (700) shown may be used by many embodiments of systems for streaming media content. However, if the difference between the PCR and PTS/DTS timestamps is different at the end of the trick play sequence from its value just before the transition to the trick play sequence, the PTS and DTS timestamps will not be accurate. Consequently, additional steps must be taken to ensure the continuity of DTS and PTS timestamps throughout the stream despite occasional trick play modes. This continuity is needed for correct performance and, in many cases, to comply with industry standard requirements. For example, if the DTS and PTS timestamps loose continuity the viewer watching the content on a playback device may experience missed video frames, video frames played out of order, macroblocking and other disruptions or visual artifacts that degrade the quality of the content playback.

Figure 8A:
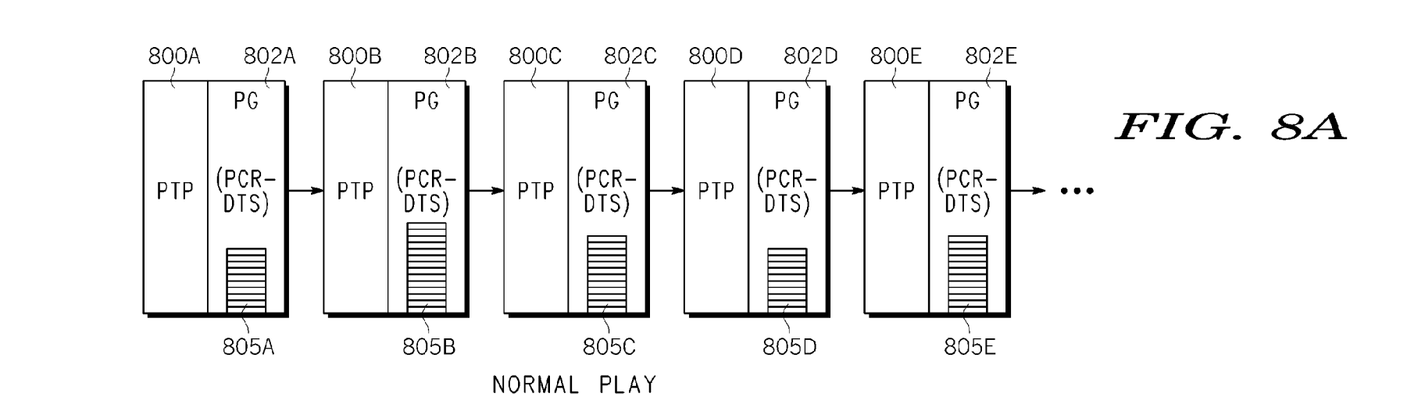
FIGS. 8A-C are diagrams of illustrative streaming data content and associated timestamp data in normal and "trick play" configurations, according to principles described herein.

Referring now to FIG. 8A, a sequence of presentation groups (802A-802E) with accompanying PTPs (800A-800E) is shown in an illustrative sequence representative of a normal play situation. Additionally, each program group (802A-802E) includes a representation of the comprehensive difference between the PCR and DTS timestamps PCR-DTS (805A-805E) once each of the presentation groups (802A-800E) has been streamed to a receiving playback device.

Figures 8B, 8C:
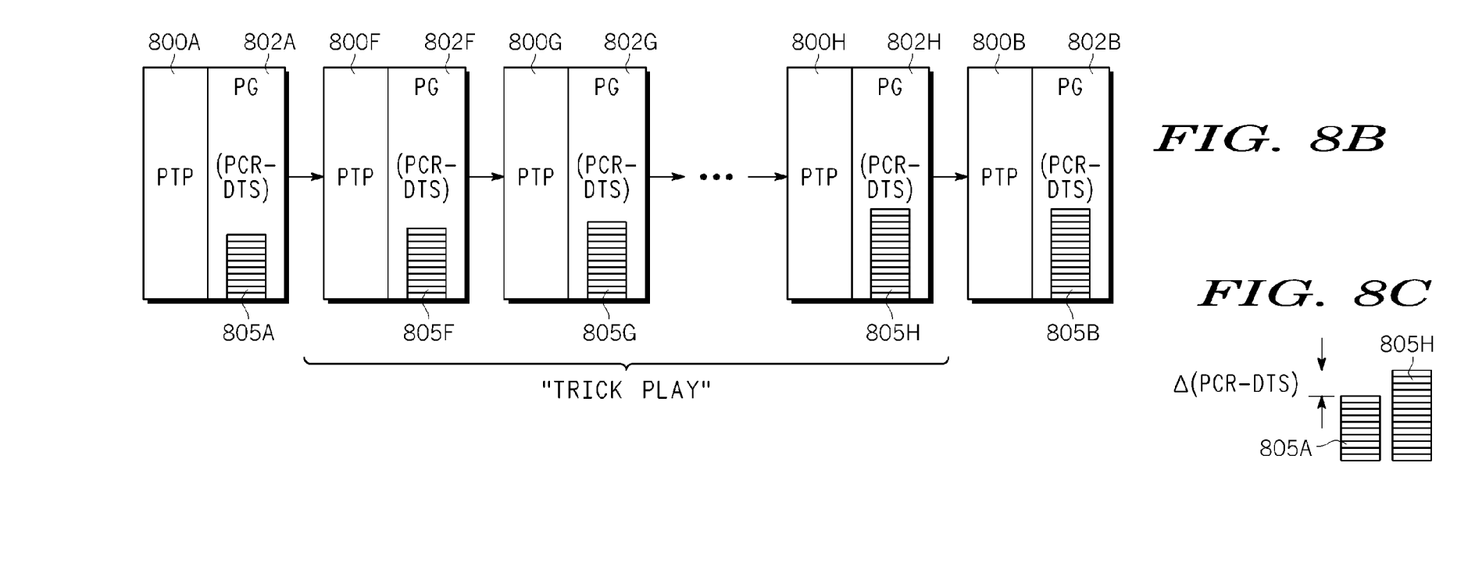

FIG. 8B shows a sequence of presentation groups (802F, 802G, 802H) with accompanying PTPs (800F, 800G, 800H) representing a trick play sequence that is initiated by a user and interjected in the normal play sequence after presentation group (802A). These trick play program groups also show representations of the comprehensive difference between the PCR and DTS timestamps PCR-DTS (805F, 805G, 805H) at the point each presentation group (802F, 802G, 802H) is streamed to the receiving playback device.

As can be seen from the figure, the number of DTS/PTS timestamps in each presentation group (802A-802H) varies relative to the number of PCR timestamps. Accordingly, the cumulative difference between the PCR timestamp value and the DTS timestamp (805A-805H) may vary as each presentation group (802A-802H) is processed in the stream. As shown in FIG. 8C, these differences produce PCR-DTS values (805D, 805H) in the transition to trick play and in the transition out of trick play.

As a result of the PCR-DTS value being different during the transition out of trick play than the transition into trick play, adding a delta_PCR value to the timestamps, as mentioned previously, will likely result in inaccuracy or inconsistency of the DTS/PTS timestamps. This is because a numerical value used to maintain continuity in PCR timestamps will not maintain continuity in DTS/PTS timestamps when the difference between the PCR and DTS/PTS timestamps is not equal to its value immediately prior to the initiation of trick play. PTS inaccuracy may in some cases become so large that a rollback (a PTS value that is less than for the previous frame in presentation order) may occur. Such a situation may violate streaming protocol requirements and may cause a decoder in the receiving device to display visual artifacts at the trick play boundary.

FIGS. 8B and 8C show a situation in which the PCR-DTS value (805A) is smaller before transitioning into trick play than the PCR-DTS value (805H) before the transition out of trick play. This may occur when the number of data packets in the unaltered stream between the point of entering the trick play mode and the point of exiting trick play mode is smaller than the number of packets corresponding to the aggregate presentation time of all video presentation units between those points.

Figures 9A, 9B, 10:
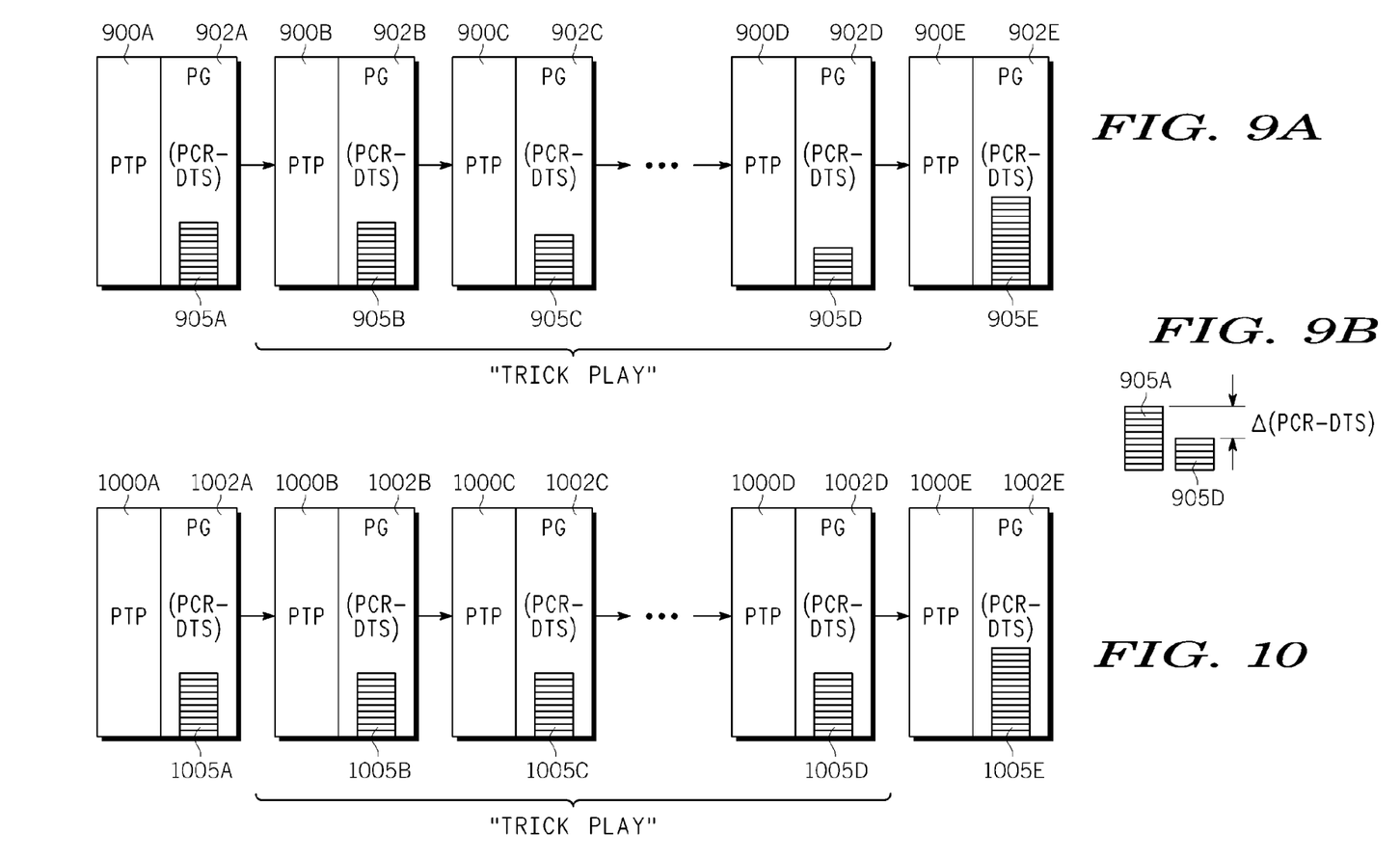
FIGS. 9A-B are diagrams of illustrative streaming data content and associated timestamp data in a trick play configuration, according to principles described herein.
FIG. 10 is a diagram of illustrative streaming data content and associated timestamp data in a trick play configuration, according to principles described herein.

Referring now to FIGS. 9A-9B, another illustrative sequence of presentation groups (902A-902E) is shown with accompanying PTPs (900A-900E) representing a trick play sequence that is initiated by a user and interjected in the normal play sequence after presentation group (902A). These trick play program groups (902B-902D) also show representations of the comprehensive difference between the PCR and DTS timestamps PCR-DTS (905A-905E) at the point each presentation group (902A-902E) is streamed to the receiving playback device.

FIGS. 9A and 9B illustrate a situation in which the PCR-DTS value (905A) is greater before transitioning into trick play than the PCR-DTS value (905D) before the transition out of trick play. This may occur when the number of data packets in the unaltered stream between the point of entering the trick play mode and the point of exiting trick play mode is greater than the number of packets corresponding to the aggregate presentation time of all video presentation units between those points. A correspondence between the aggregate presentation time of frames and the number of packets is governed by the content bitrate. Content bitrate can be derived from PCR values.

Referring now to FIG. 10, another illustrative sequence of presentation groups (1002A-1002E) is shown with accompanying PTPs (1000A-1000E) representing a trick play sequence that is initiated by a user and interjected in the normal play sequence after presentation group (1002A). These trick play program groups (1002B-1002D) also show representations of the comprehensive difference between the PCR and DTS timestamps PCR-DTS (1005A-1005E) at the point each presentation group (1002A-1002E) is streamed to the receiving playback device.

The specification now describes an illustrative technique to overcome the issues described above with respect to FIGS. 7-9. To achieve the goals of maintaining the constant monotonic increment of the DTS, PTS, and PCR timestamps at all times, including during and after trick play, the difference between PCR and DTS timestamp as close as possible to the PCR-DTS value that exists at each location within the unaltered stream that is being passed during trick play.

Data in the PTPs (1000A-1000E) are used to maintain a uniform offset between the PCR and DTS timestamps. For example, before each presentation group (1002B-1002D) in trick play is incorporated by a streaming device into a stream to a receiving playback device, the streaming device examines the PTP (1000B-1000D) of that presentation group (1002B-1002D) for length information and data that allows a calculation to be made of the number of null packets and video presentation units that will be inserted into the data stream.

The streaming device may then determine the potential change in the difference between the PCR and the DTS timestamps from the program group (1002B-1002D). Then, as the packets in the presentation group (1002B-1002D) are streamed to the receiving device, additional filler packets are inserted into the stream by the streaming device to maintain the PCR-DTS differential at a constant value after each program group (1002B-1002D) is streamed. For example, the streaming device may insert additional "P-Repeat" video frames that increase the DTS/PTS timestamps in the program group (1002B-1002D) to reduce or prevent an increase in the PCR-DTS differential value (1005B-1005D). For program groups (1002B-1002D) in which the PCR-DTS value (1005B-1005D) is to expected to increase, null packets that increase the PCR timestamps, but not the DTS/PTS timestamps, may be used to prevent a change in the PCR-DTS differential value. By holding the PCR-DTS differential value (1005B-1005D) constant after each program group (1002B-1002D) is streamed, continuity in the incrementing of the PCR, DTS, and PTS timestamps may be obtained throughout the entire stream.

Figure 11:
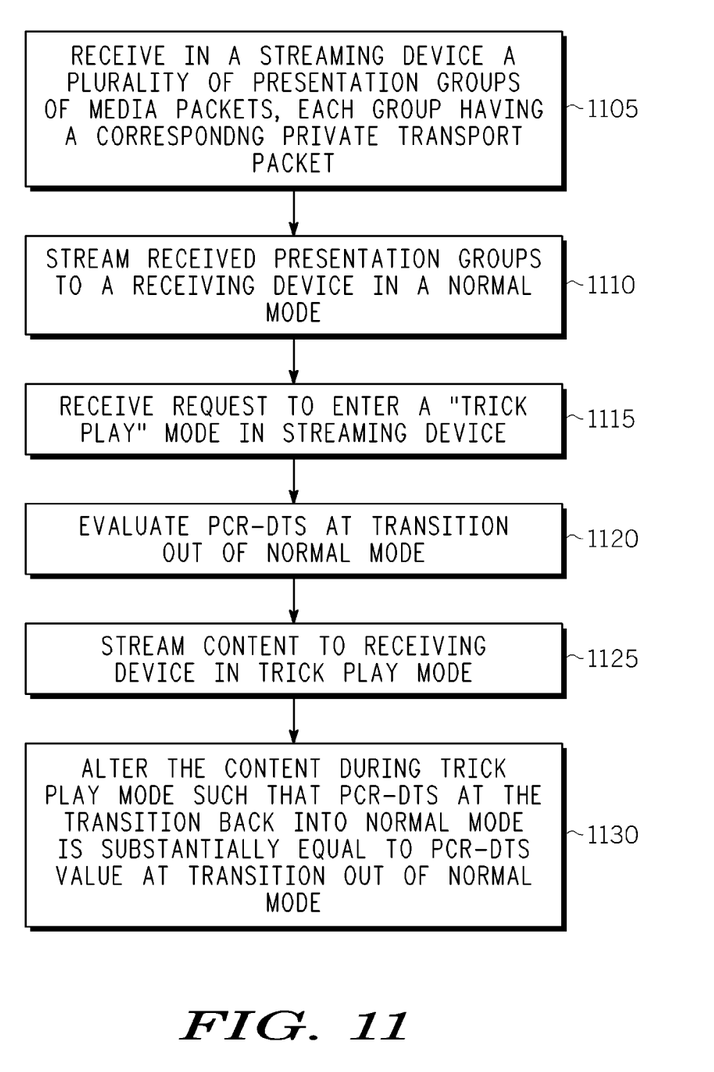
FIG. 11 is a flowchart depicting an illustrative method of processing time-based data, according to principles described herein.

Referring now to FIG. 11, a flowchart of an illustrative method of processing time-based content, such as MPEG-formatted content, is shown. The illustrative method provides for the constant monotonic increment of PCR, DTS, and PTS timestamps throughout a program stream, regardless of mode, normal or trick play.

The illustrative method (1100) includes receiving (step 1105) a plurality of presentation groups of content packets in a streaming device. Each group has a corresponding private transport packet that stores metadata concerning the presentation group. The private transport packets may contain pointers to a next presentation group to be streamed, depending on the current streaming mode, as has been described above.

The received groups are then streamed (step 1110) to a receiving playback device in a normal mode, according to the principles described herein. A request is received (step 1115) from the receiving playback device to enter a trick play mode. A numerical difference between the PCR and DTS (PCR-DTS) timestamps is evaluated (step 1120) at the transition out of the normal play mode. This may occur by evaluating the timestamp increments encoded in the media data packets in the presentation groups.

The content is then streamed (step 1125) in the requested trick play mode. The content is altered (step 1130) during the trick play mode such that the numerical difference between the timestamps (PCR-DTS) at the transition back into normal play mode is substantially equal to the numerical difference between the timestamps at the transition out of normal play mode. The content may be altered by inserting additional packets into the presentation groups such that after each presentation group is streamed, the PCR-DTS value is equal to the PCR-DTS value at the transition out of normal play mode. The additional packets may be configured to increment the DTS and PTS timestamps, such as P-repeat packets in the MPEG-2 protocol. The additional packets may also be configured to increment only the PCR and not the DTS or PTS, such as null packets.

Figure 12:
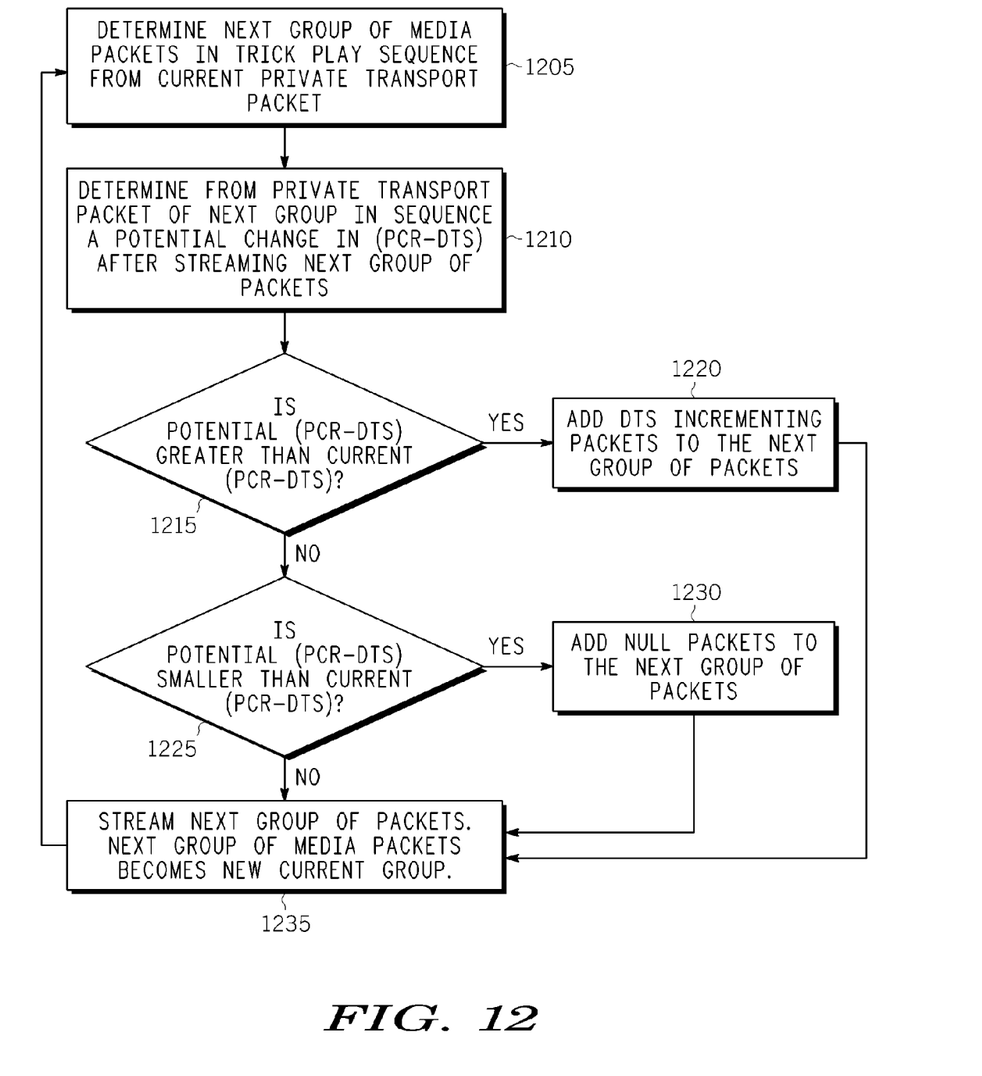
FIG. 12 is a flowchart depicting an illustrative method of processing time-based data, according to principles described herein.

Referring now to FIG. 12, a flowchart is shown illustrating another method (1200) of processing time-based content. The method includes determining (step 1205) a next presentation group of the content to stream in a trick play sequence using a pointer in a private transport packet associated with a current presentation group of the content. A potential change in the PCR-DTS value is then determined (step 1210) from data in a private transport packet corresponding to that next presentation group.

It is then determined (decision 1215) if the potential PCR-DTS value is greater than the current PCR-DTS value. If so, DTS incrementing packets (such as MPEG P-repeat frames) are added (step 1220) to the next presentation group such that the DTS and PTS timestamps increment more times during the stream of the next presentation group, thus offsetting the potential change in PCR-DTS. The next presentation group of packets is then streamed (step 1235) and becomes the new current presentation group, and the process is repeated.

If it is determined (decision 1225) that the potential PCR-DTS value is smaller than the current PCR-DTS value, PCR incrementing packets that do not increase the DTS and PTS timestamps are then inserted into the next presentation group such that the PCR timestamps increment more times during the streaming of the next presentation group, thus offsetting the potential change in PCR-DTS. These packets may contain null data. The next presentation group of packets is then streamed (step 1235) and becomes the new current presentation group, and the process is repeated.

In the event that the potential PCR-DTS value is determined (decisions 1215, 1225) to not be greater or smaller than the current PCR-DTS value, it may be assumed that the potential PCR-DTS value is substantially equal to the current PCR-DTS value, and the next group of packets may be streamed (step 1235) without substantially alteration.

The processes shown in FIGS. 7, 11 and 12, and described herein may be implemented in a general, multi-purpose or single purpose processor. Such a processor will execute instructions, either at the assembly, compiled or machine-level, to perform that process. Those instructions can be written by one of ordinary skill in the art following the description of FIGS. 7, 11 and 12 and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

The preceding description has been presented only to illustrate and describe embodiments and examples of the principles described. This description is not intended to be exhaustive or to limit these principles to any precise form disclosed. Many modifications and variations are possible in light of the above teaching.

We claim:

1. A method of processing time-based content for streaming groups of content elements os said time-based content to a receiving device, the method comprising:
generating data for each of the groups of content elements in the time-based content for supporting multiple trick play speeds;
evaluating a numerical difference between a program clock reference (PCR) timestamp and a decode timestamp (DTS) for a first group of content elements in said time-based content at a transition to a trick play mode out of a normal mode;
identifying, from the data generated for each of the groups of content elements in the time-based content, a plurality of subsequent groups of content elements of said time-based content to be streamed to said receiving device that correspond to the requested trick play speed;

for each of the plurality of subsequent group of content elements identified for streaming during the trick play mode at the requested trick play speed:
calculating a number of packets to be added to the respective subsequent group of content elements for maintenance of a buffer in the receiving device;
determining a potential change in the PCR-DTS numerical difference between the first group of content elements and the respective subsequent group of content elements with the calculated number of packets;
adding timestamp-incrementing packets in the respective subsequent group of content elements corresponding to the trick play mode for offsetting the potential change in the PCR-DTS numerical difference, wherein the timestamp-incrementing packets are added by at least one of:
inserting DTS-incrementing packets in the subsequent group of content elements to increase the incrementing of both the DTS and PTS timestamps if a potential PCR-DTS value for the subsequent group of packets is greater than the PCR-DTS value for the first group of content elements, or
inserting PCR-only-incrementing packets in the subsequent group of content elements for increasing incrementing of the PCR without incrementing DTS or PTS if the potential PCR-DTS for the subsequent group of packets is smaller than the PCR-DTS value for the first group of content elements;
streaming said subsequent group of content elements to the receiving device,
wherein offsetting the potential change in the PCR-DTS value for each subsequent group of content elements provides continuity in incrementing respective timestamps for the group of content elements throughout the stream of time-based content.

2. The method of claim 1, wherein said time-based content is divided into a plurality of discrete presentation groups, each of said presentation groups comprising at least one data packet.

3. The method of claim 2, wherein each of said presentation groups comprises a pointer to a next presentation group to be streamed, according to a current streaming mode.

4. The method of claim 2, further comprising evaluating timestamp increments encoded in said data packets in said presentation groups.

5. The method of claim 4, further comprising inserting additional packets into said presentation groups such that after each presentation group is streamed the second timestamp difference.

6. The method of claim 5, wherein said additional packets are configured to increment said decode timestamp.

7. The method of claim 5, wherein said additional packets are configured to increment said program clock reference and not said decode timestamp.

8. The method of claim 1, wherein said time-based content is formatted according to MPEG (Moving Picture Experts Group)-2 or MPEG-4.

9. A method of processing time-based content, comprising:
determining a next presentation group of said content to stream in a trick play sequence using a pointer in a private transport packet associated with a current presentation group of said content;
determining a change in numerical difference between a program clock reference timestamp and a decode timestamp from data in a private transport packet of said next presentation group from a program clock reference timestamp and a decode timestamp from data in a private transport packet of the current presentation group ;
inserting additional packets to said next presentation group to offset said change, wherein inserting the packets are added to the next presentation group in accordance with;
inserting DTS-incrementing packets in the subsequent group of content elements to increase the incrementing of both the DTS and PTS timestamps if a potential PCR-DTS for the subsequent group of packets is greater than the PCR-DTS value for the first group of content elements, or
inserting PCR-only-incrementing packets in the subsequent group of content elements for increasing incrementing of the PCR without incrementing DTS or PTS if the potential PCR-DTS for the subsequent group of packets is smaller than the PCR-DTS value for the first group of content elements;
wherein the next presentation group is a first next presentation group identified as the current presentation group for evaluation of a second next presentation group.

10. The method of claim 9, wherein said additional packets are configured to increment said decode timestamp.

11. The method of claim 10, wherein said additional packets comprise data configured to repeat a video frame and increment said decode timestamp.

12. The method of claim 9, wherein said additional packets are configured to increment said program clock reference and not said decode timestamp.

13. The method of claim 12, wherein said additional packets comprise null data.

14. The method of claim 9, further comprising streaming said next presentation group.

15. The method of claim 9, further comprising transitioning into a normal streaming mode from streaming the trick play sequence.

16. The method of claim 9, wherein said time-based content is formatted according to MPEG (Moving Picture Experts Group)-2 or MPEG-4.

17. A system of processing time-based content, comprising:
a buffer configured to at least temporarily store portions of said time-based content received from a content source;
an analyzer in communication with said buffer configured to analyze portions of said time-based content and generate metadata associated with a plurality of analyzed portions of a logical data stream; and
a stream processor configured to analyze said metadata and alter said time-based content to maintain a difference between a program clock reference timestamp and a decode timestamp at a substantially constant value after streaming each of said portions in a trick play mode to a receiving device, wherein altering said time-based content includes at least one of:
inserting DTS-incrementing packets in the subsequent group of content elements to increase the incrementing of both the DTS and PTS timestamps if a potential PCR-DTS for the subsequent group of packets is greater than the PCR-DTS value for the first group of content elements, or
inserting PCR-only-incrementing packets in the subsequent group of content elements for increasing incrementing of the PCR without incrementing DTS or PTS if the potential PCR- DTS for the subsequent group of packets is smaller than the PCR-DTS value for the first group of content elements.

18. The system of claim 17, wherein each of said portions of said time-based content comprises a discrete presentation group having at least one data packet.

19. The system of claim 18, wherein each of said presentation groups comprises a pointer to a next presentation group to be streamed based on a current streaming mode.

20. The system of claim 17, wherein said stream processor is further configured to evaluate timestamp increments encoded in data packets of said portions of time-based content.

21. The system of claim 17, wherein said stream processor is configured to insert additional packets into said portions of time-based content.

22. The system of claim 21, wherein said additional packets are configured to increment said decode timestamp.

23. The system of claim 21, wherein said additional packets are configured to increment said program clock reference and not said decode timestamp.

* * * * *